United States Patent [19]

Deichstetter et al.

[11] Patent Number: 5,031,740
[45] Date of Patent: Jul. 16, 1991

[54] HIGH SPEED CAM ACTUATED DISCONNECT

[75] Inventors: Alfred A. Deichstetter; Martin S. Johnson, both of Rockford, Ill.

[73] Assignee: Sundstrand Corporation, Rockford, Ill.

[21] Appl. No.: 441,466

[22] Filed: Nov. 27, 1989

[51] Int. Cl.$^5$ .................... F16D 11/04; F16D 23/12
[52] U.S. Cl. ....................... 192/24; 192/67 R; 192/114 R
[58] Field of Search ............ 192/24, 89 A, 101, 67 R, 192/114 R; 244/60

[56] References Cited

U.S. PATENT DOCUMENTS

| | | | |
|---|---|---|---|
| 1,193,008 | 8/1916 | Fuller | 192/24 |
| 1,367,309 | 2/1921 | Dunham | 192/24 X |
| 2,642,970 | 6/1953 | Szekely | 192/24 |
| 3,365,981 | 1/1968 | Gantzer | 475/77 |
| 3,441,116 | 4/1969 | Quenneville | 192/24 X |
| 4,042,088 | 8/1977 | Schmohe | 192/114 R |
| 4,195,718 | 4/1980 | Schmohe | 192/67 R |
| 4,244,455 | 1/1981 | Loker | 192/24 |
| 4,434,881 | 3/1984 | Denk et al. | 192/89 A |

*Primary Examiner*—Rodney H. Bonck
*Attorney, Agent, or Firm*—Antonelli, Terry, Stout & Kraus

[57] ABSTRACT

A mechanical disconnect mechanism for an aircraft engine driven constant speed drive unit where the driving shaft (14) and the driven shaft (18) are drive connected by toothed clutch members (16,24). The disconnect involves a cam (38) which causes a sleeve (22) to slide axially by a distance sufficient to disconnect the clutch teeth by engagement with a pawl (42) that is normally held in an inactive position but released under emergency conditions.

7 Claims, 2 Drawing Sheets

HIGH SPEED CAM ACTUATED DISCONNECT

TECHNICAL FIELD

This invention relates to the constant speed drive ("CSD") mechanism or transmission and more particularly to a high speed disconnect between an input and output that cannot automatically return to engaged position regardless of the speed when the disconnect function occurs.

BACKGROUND ART

Constant speed drive units are commonly found in aircraft for driving alternators and hydraulic pumps from main engine shaft rotation. One such unit is disclosed in Gantzer U.S. Pat. No. 3,365,981 granted Jan. 30, 1968.

In such units which are normally engaged with the main engine shaft at all times, there has been a disconnect feature for emergency use usually including a solenoid actuatable from the cockpit and a thermal coupling actuated automatically in the event of overheating of the transmission. A solution to a problem arising when the disconnect is actuated at low speeds is discussed in Schmohe U.S. Pat. No. 4,042,088 issued Aug. 16, 1977. Attachment of the constant speed drive unit to an engine housing and the provision of a retractable shaft is disclosed in the Schmohe U.S. Pat. No. 4,195,718 issued Apr. 1, 1980.

In these prior art disconnect devices, the specially shaped screw thread on the axially slidable sleeve which carries the clutch teeth for the driven member functions satisfactorily at shaft speeds of up to approximately ten-thousand rpm. At higher speeds, the plunger which is solenoid released, does not reliably engage the threads on the axially slidable sleeve and the disconnect function is sometimes not realized.

SUMMARY OF INVENTION

A major object of the present invention is to replace the screw thread and plunger structure of this prior art with a novel disconnect structure that has improved reliability of operation at speeds up to as high as twenty-seven thousand rpm and yet which is totally reliable at low speeds.

Another object is to provide a novel cam and pawl structure which is spring loaded toward a cam engaging position and solenoid released to effect the disconnect in a conventional manner. Engagement of the pawl with the cam which rotates with the axially slidable sleeve causes the disconnect between the clutch teeth on the driving and driven members at all speeds. Reconnection is not possible until the pawl is reset, usually manually, against the force of the pawl spring.

Another object of the invention is to provide a novel cam configuration which is receptive to pawl engagement for more than one half of each shaft circumference and which provides a 0.2 inch rise to disengage the clutch teeth in as little as 120° of shaft circumference. The shape of the cam can be changed to vary the rate of rise to reduce abruptness of the axial acceleration and deceleration of the axially slidable sleeve. This shape allows the period of up to 1.1μ sec. for pawl engagement at twenty-seven thousand rpm shaft speed; for the same shaft speed the prior art screw disconnect would provide a 0.37μ sec. engagement time.

These and other objects of the invention will become more fully apparent from the claims and from the description as it proceeds in conjunction with the accompanying drawings.

BEST MODE FOR CARRYING OUT THE INVENTION

Figure 1:
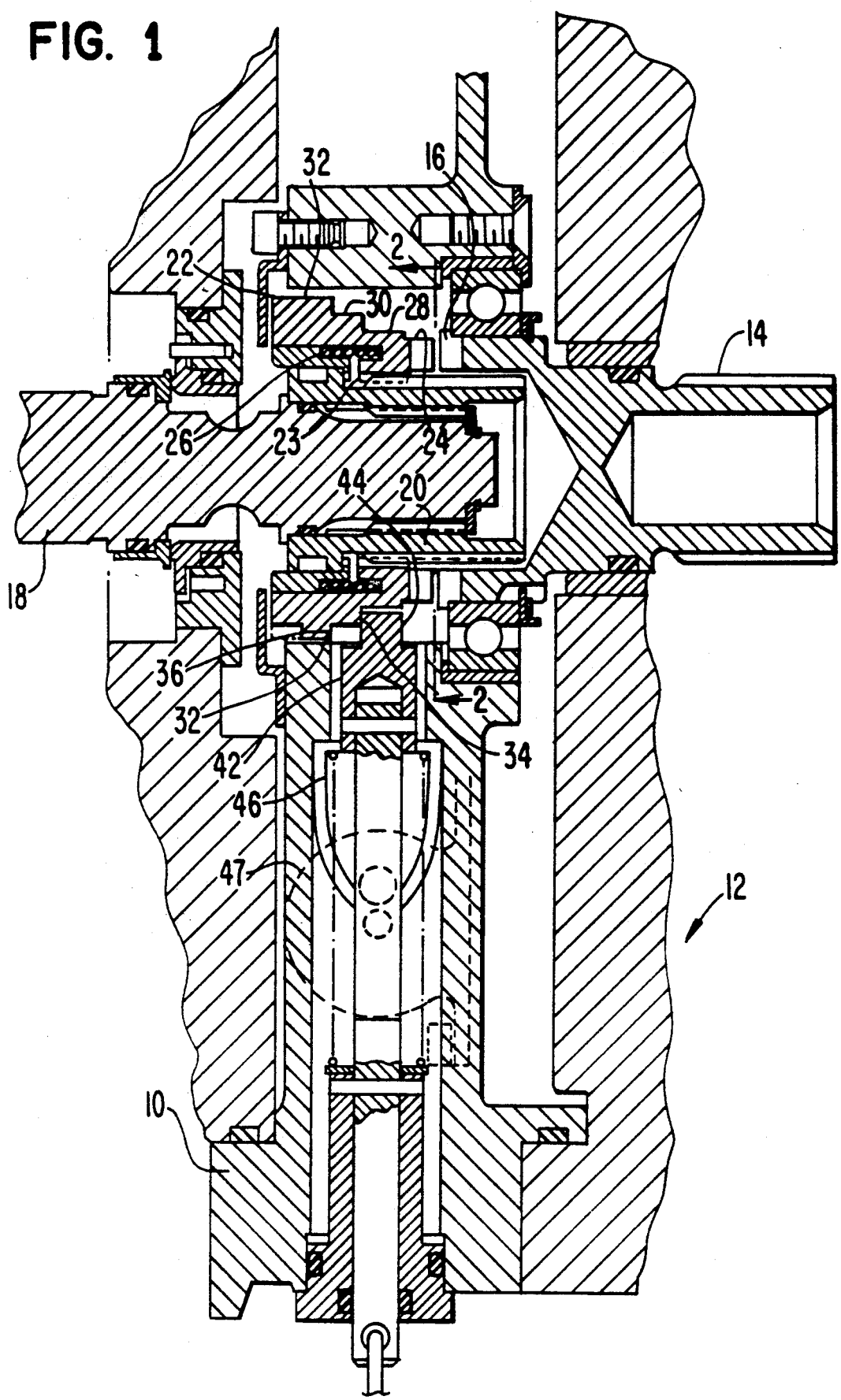
FIG. 1 is a view in section of a portion of a constant speed drive unit and a driving shaft showing the clutch faces in a disconnect position.

The drive connection is for a constant speed drive transmission having a frame 10 that is attached to a housing or frame 12 of an aircraft engine which powers a driving shaft 14 that terminates with a toothed clutch member 16 as shown in FIG. 1. The constant speed drive transmission 10 has a spline driven shaft 18 that is coaxially aligned with the driving shaft 14 and is spline connected to an adapter 20. An axially slidable sleeve 22 is connected by a spline 23 to the outer surface of adapter 20.

Clutch teeth 24 on one end face of sleeve 22 are shown in FIG. 1 in a disengaged position. For normal operation, sleeve 22 is biased by spring 26 into the non-illustrated clutch teeth engaging position.

Figure 2:
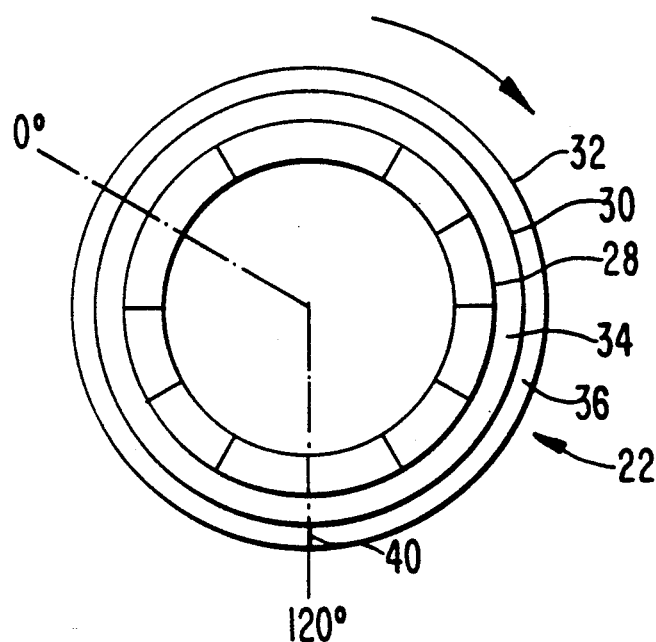
FIG. 2 is a view of the axially slidable member which carries the driven member clutch teeth taken along line 2—2 of FIG. 1.
Figure 3:
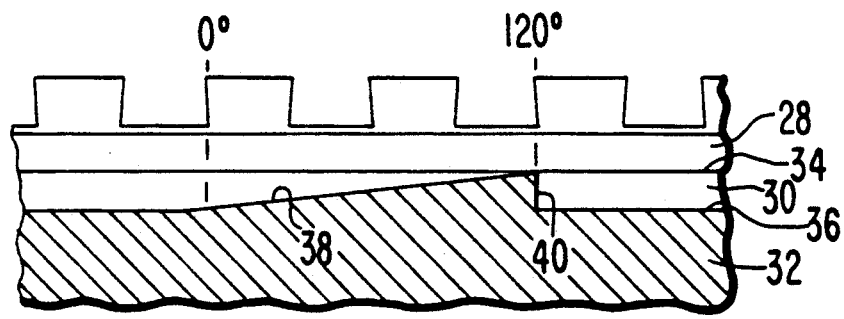
FIG. 3 is a rollout view of the cylindrical surfaces to show the cam surface which causes the disconnect action between the clutch teeth.

With reference also to FIGS. 2 and 3, sleeve 22 may be constructed to have three stepped cylindrical surfaces 28, 30 and 32. Cylindrical surface 28 has the smallest diameter. Cylindrical surface 32 which has the largest diameter is at the periphery of sleeve 22. Cylindrical surface 30 has a diameter larger than that of the cylindrical surface 28. The wall 34 lies in a radial plane between the edges of the cylindrical surface 28 having the smaller diameter and of the cylindrical surface 30 having the next larger diameter. The wall 36 between the edges of the cylindrical surface 30 and the outer peripheral surface 32 has a first portion which is parallel to wall 34 and a cam portion 38 which is angularly related to the first portion between a zero degree reference position and a 120° position as indicated on FIGS. 2 and 3. The cam surface 38 traverses the cylindrical surface 30 along less than one half of the sleeve circumference and preferably about one-third of the sleeve circumference as illustrated to terminate at wall 34 at a circumferential position of the wall 40. The larger diameter surface 30 has a diminishing length in the axial direction along a circumferential portion less than 180° of the sleeve circumference, and preferably about 120°.

A disconnect pawl generally indicated by the reference numeral 42 has a nose portion 44 which is shown to be adjacent to cylindrical surface 28 and in engagement with wall 34. Pawl 42 is mounted for movement along a radial line. When pawl 42 is retracted to a normal position radially outwardly of peripheral surface 32, sleeve 22 is urged to the right as viewed in FIG. 1 by spring 26 to cause the clutch teeth 16 and 24 to be engaged.

Disconnect pawl 42 is biased by a compression spring 46 to its illustrated position. Pawl 42 is normally held in a non-illustrated retracted position by a cockpit operated solenoid plunger 47 and by a thermal coupling as disclosed in the above mentioned Gantzer U.S. Pat. No.

3,365,981. As disclosed in that Gantzer patent, a reset handle is provided on the exterior of the constant speed drive transmission housing 10 to permit the manual resetting of the disconnect pawl 42 when the driving shaft 14 is not rotating.

The disconnect function must be possible at any speed of shaft 14 up to and including about 27,000 rpm whereas the reconnection occurs only when the driving shaft is not rotating. When the pawl 42 is released to move radially inwardly toward rotating sleeve 22 under the force of spring 46, the end surface on the nose 44 is in radial alignment with larger cylindrical surface 30. As sleeve 22 rotates, the nose 44 of pawl 42 will engage cylindrical surface 30. As the zero degree position shown in FIGS. 2 and 3 of sleeve 22 reaches pawl nose 44, the cam surface 38 engages a side wall of the nose 44 and causes sleeve 22 to slide to the left as viewed in FIG. 1. Within a circumferential rotation of less than 180°, and preferably about 120° as illustrated, sleeve 22 is displaced by about one-fifth or one-quarter of an inch which is sufficient to separate the clutch teeth 16 and 24 and thereby perform the disconnect function, normally during one revolution.

The sleeve 22 is maintained in the disconnect position by the engagement between a side wall of the nose portion 44 of pawl 42 and wall 34 that is continuous and lies in a radial plane.

While only a single embodiment has been illustrated and described, it is evident that other modifications and alternatives will become apparent to those skilled in this art. All changes and modifications which fall within the scope of the appended claims are intended to be covered thereby.

We claim:

1. In a combination with an aircraft having a constant speed drive mechanism and a driving shaft which has a variable rotational speed which may exceed ten thousand rpm and clutch teeth, a driven shaft mounted for rotation in said constant speed drive mechanism by clutch teeth on a sleeve that is spline coupled to said driven shaft and axially slidable along an end portion of said driven shaft, and means for axially shifting said sleeve to disengage said clutch teeth including:
    a cam surface on said sleeve; and
    a pawl mounted for radial movement relative to said sleeve, said pawl having a side wall which is selectively movable to engage said cam surface, said cam surface extending less than 180° of the sleeve circumference thereby to provide a circumferential distance for pawl engagement with the cam surface of said sleeve sufficient to disengage said clutch teeth, and wherein the pawl is spring biased radially toward said sleeve and moves inwardly of said sleeve when the clutch teeth are disengaged to engage a further surface which maintains the clutch teeth disengaged.

2. The combination of claim 1 wherein the cam surface extends about 120° of the sleeve circumference thereby to provide a circumferential distance for pawl engagement with said sleeve of about 240°.

3. The combination of claim 1 wherein the cam surface and pawl causes a sliding displacement of at least 0.2 inches within one revolution of the sleeve.

4. In a constant speed drive mechanism, a disconnectable drive comprising:
    a driven shaft coaxial with an external driving shaft and mounted in a frame of said constant speed drive mechanism;
    an axially slidable sleeve spline connected to said driven shaft;
    normally engaged facing clutch teeth on the driving shaft and on the sleeve;
    resilient means rotatable with said sleeve for urging the clutch teeth on said sleeve into driving engagement with the clutch teeth on the driving shaft; and
    disconnect means for separating said clutch teeth comprising:
        first and second cylindrical surfaces with diameters of different sizes located axially adjacent to one another about the entire circumference of the sleeve with a radially directed surface extending between adjacent edges of the first and second surfaces to form a stepped configuration on said sleeve, the larger diameter cylindrical surface having a diminishing length in an axial direction along a circumferential portion less than 180° of the sleeve circumference;
        a pawl mounted for movement along a radial direction relative to said cylindrical surfaces and biased toward initial engagement with the larger diameter surface and for subsequent engagement with the smaller diameter surface; and
        said pawl being normally held at a position that is spaced from engagement with either cylindrical surface and releasable to effect disconnect of the respective clutch teeth and to maintain the clutch teeth separated while the driving shaft continues rotation and rotation of the driven shaft ceases.

5. The drive as defined in claim 4 wherein:
    the pawl, when spaced from said cylindrical surfaces, is in radial alignment with the larger diameter cylindrical surface, and
    the sleeve shifts in an axial direction while the pawl engages a cam surface that extends radially outwardly from the larger diameter surface to transfer the pawl from the larger diameter surface toward the smaller diameter surface.

6. The drive as defined in claim 5 wherein the cam surface is generally perpendicular to the larger diameter surface and within a circumferential distance of about 120° of the sleeve circumference the cam surface is effective to slide said sleeve by a distance sufficient to disengage said clutch teeth; and a circumferential distance for pawl engagement with said sleeve is about 240°.

7. The drive as defined in claim 6 wherein the pawl is spring biased to be urged toward said cylindrical surfaces and slides along a circumference of said cam surface to engage the smaller diameter surface as the sleeve slides to its disconnect position and thereby maintain the disconnect function after only one revolution of said sleeve following engagement between the pawl and said larger diameter surface.

* * * * *